(12) United States Patent
Horst (10) Patent No.: US 7,777,386 B2
(45) Date of Patent: Aug. 17, 2010

(54) ELECTRIC MACHINE

(75) Inventor: Gary E. Horst, Manchester, MO (US)

(73) Assignee: Emerson Electric Co., St. Louis, MO (US)

(*) Notice: Subject to any disclaimer, the term of this patent is extended or adjusted under 35 U.S.C. 154(b) by 309 days.

(21) Appl. No.: 12/024,541

(22) Filed: Feb. 1, 2008

(65) Prior Publication Data

US 2009/0195109 A1 Aug. 6, 2009

(51) Int. Cl.
*H02K 1/06* (2006.01)

(52) U.S. Cl. .................. 310/216.004; 310/156.01

(58) Field of Classification Search ............. 310/156, 310/216, 216.004; H02K 1/06
See application file for complete search history.

(56) References Cited

U.S. PATENT DOCUMENTS

| | | | |
|---|---|---|---|
| 3,324,371 A | 6/1967 | Stauffer | |
| 3,348,183 A | 10/1967 | Hodges et al. | |
| 3,450,338 A | 6/1969 | Huttenlocher | |
| 3,488,569 A | 1/1970 | Allendorph et al. | |
| 3,515,919 A | 6/1970 | Houtman | |
| 3,528,171 A | 9/1970 | Houtman | |
| 3,942,055 A | 3/1976 | Hoffmeyer | |
| 4,035,910 A | 7/1977 | Kindig | |
| 4,100,444 A | 7/1978 | Boyd, Jr. | |
| 4,107,583 A | 8/1978 | Houtman | |
| 4,880,391 A | 11/1989 | Hurtgen | |
| 4,899,074 A * | 2/1990 | West | 310/154.27 |
| 6,114,790 A | 9/2000 | Fei | |
| 6,257,840 B1 | 7/2001 | Ignatiev et al. | |
| 6,319,604 B1 * | 11/2001 | Xu | 428/379 |
| 6,349,558 B1 | 2/2002 | Ichikawa et al. | |
| 6,544,009 B2 | 4/2003 | Makino et al. | |
| 6,634,182 B2 | 10/2003 | Ichikawa et al. | |
| 6,708,520 B2 | 3/2004 | Yasunori et al. | |
| 7,082,786 B2 | 8/2006 | Yasunori et al. | |
| 7,138,741 B2 * | 11/2006 | Lee | 310/216.091 |
| 7,520,148 B2 * | 4/2009 | Choi | 68/140 |
| 2004/0056557 A1 | 3/2004 | Enomoto et al. | |
| 2005/0088047 A1 * | 4/2005 | Crapo et al. | 310/51 |
| 2005/0103074 A1 | 5/2005 | Kim et al. | |

(Continued)

FOREIGN PATENT DOCUMENTS

CN 2031175 UU 1/1989

(Continued)

*Primary Examiner*—Quyen Leung
*Assistant Examiner*—John K Kim
(74) *Attorney, Agent, or Firm*—Senniger Powers LLP (57) ABSTRACT

A stator assembly adapted for use in an external rotor electric motor. The assembly includes a stator core having a hub, a plurality of teeth extending radially outward from the hub, a root tooth diameter and an outer diameter. Each tooth has a root, a neck extending from the root and a head opposite the root. The neck has a maximum width. Each adjacent pair of teeth has a pitch measured at the roots of the corresponding teeth. The assembly includes a winding wrapped around each tooth of at least three teeth of the stator core. A ratio of the root tooth diameter of the stator core to the outer diameter of the stator core is less than about 0.75. A ratio of the maximum tooth neck width to the tooth pitch measured at the root of the teeth is greater than about 0.36.

42 Claims, 6 Drawing Sheets

U.S. PATENT DOCUMENTS

| | | |
|---|---|---|
| 2005/0127775 A1* | 6/2005 | Lee et al. .................... 310/216 |
| 2005/0189836 A1* | 9/2005 | Lee et al. .................... 310/215 |
| 2005/0189837 A1* | 9/2005 | Lee ............................ 310/217 |
| 2005/0194859 A1* | 9/2005 | Lee ............................ 310/216 |
| 2005/0194860 A1* | 9/2005 | Lee ............................ 310/217 |
| 2005/0241346 A1* | 11/2005 | Choi ............................ 68/140 |
| 2006/0163966 A1 | 7/2006 | Yang et al. |
| 2006/0261698 A1* | 11/2006 | Lee ............................ 310/216 |
| 2007/0007843 A1 | 1/2007 | Matsubara |
| 2008/0012438 A1 | 1/2008 | Hong |
| 2008/0084139 A1* | 4/2008 | Schroer et al. ............ 310/67 R |
| 2008/0129131 A1 | 6/2008 | Shin et al. |

FOREIGN PATENT DOCUMENTS

| | | |
|---|---|---|
| CN | 1476151 A1 | 2/2004 |
| CN | 2650377 YY | 10/2004 |
| EP | 1863148 A2 | 12/2007 |
| JP | 58189354 A1 | 11/1983 |
| JP | 200083339 A1 | 10/2000 |
| WO | 2008032942 A1 | 3/2008 |
| WO | 2008055408 A1 | 5/2008 |

* cited by examiner

ELECTRIC MACHINE

BACKGROUND

The present invention relates to electric machines, such as motors or generators, and more particularly to external rotor, brushless permanent magnet (BPM) electric machines having aluminum windings.

Electric machines, such as motors or generators, typically include a stator mounted inside a housing and a rotor supported in the housing for rotation relative to the stator. The stator and/or the rotor of the machines have windings comprising coils of wire. In motors, electricity is delivered through these coils to generate magnetic fields, causing the rotor to turn. In generators, the electricity is generated in the windings as the rotor turns. Although different electrically conductive materials may be used to make the windings, in the past these windings have frequently been made from copper or copper alloys. Electric machines are often integrated into appliances such as washing machines and apparatus such as stationary bicycles and treadmills. The size, performance and cost of the appliance incorporating the electric machine may be important factors when making purchasing decisions. The size, performance and cost of the electric machine frequently have a significant impact on the overall size and cost of the appliance.

Conventional high-torque, low speed motors with copper windings often have shorter teeth, resulting in reduced (i) noise, (ii) ampere drops in the teeth, and (iii) deleterious flux saturation effects. More specifically, shorter teeth are structurally stronger to resist forces, and reduce vibration and noise. Also conventionally, some short teeth were too thin and structurally weak to resist vibration, requiring other mechanical means to strengthen the teeth, such as additional structural members connecting the free ends of adjacent teeth to one another (e.g., wires). Moreover, shorter teeth, which carry flux, require less ampere turns (i.e., current) to drive the flux through the teeth and reduce the deleterious effects of flux saturation. Thus, lower driving currents result in lower wire current (i.e., $I^2R$) losses. Moreover, excessive saturation can result in non-linear torque per amperage at high torque loads. Thus, in the past, to optimize motor design, copper windings were paired with desirable short teeth to optimize performance of the motor and reduce these unwanted effects.

Further, in the case of washing machines, motor weight can affect washing machine performance because higher motor weights increase susceptibility of the washing machine to unbalance. Thus, lighter motors are desirable. Conventionally, copper windings are used in motors for washing machines. If other conductive materials having lower density, such as aluminum, were used, washing machines that are less likely to become unbalanced could be made. But most of these lower density materials are less conductive than copper. Therefore, larger gauge wire must be used in the windings. The larger wire gauge allows greater heat transfer, potentially resulting in lower motor operating temperatures.

In addition, prices of conductive materials fluctuate. At times, some winding materials are more expensive than others. For example, sometimes copper is very expensive relative to other electrically conductive materials such as aluminum. Electrical conductivity of the material is also a significant consideration. As conductivity decreases, larger windings must be used to overcome losses. However, larger windings raise concerns about machine size and resulting appliance size. Thus, even though some materials such as aluminum can have a cost advantage over more frequently used materials such as copper, copper may still be used due to these other concerns such as size. Conventionally, modifying a motor designed for copper windings to accept aluminum windings at similar performance required a motor having a greater volume. This volume increase was often accomplished by increasing the diameter and/or the length of the motor to accommodate increased aluminum winding volume over the conventional copper winding volume. But if the exterior size of the motor is restricted by the application in which the motor is to be used, these increases in length and/or diameter cannot be accomplished and the alternative winding material (e.g., aluminum) cannot be used without sacrificing performance. It would be advantageous if the electric machine could incorporate more cost effective materials (e.g., aluminum windings) while maintaining similar performance in a motor having a substantially equal diameter and length.

BRIEF SUMMARY

In some embodiments, the present invention relates to a stator assembly adapted for use in an external rotor electric motor. The assembly comprises a stator core having a hub, a plurality of teeth extending radially outward from the hub, a root tooth diameter and an outer diameter. Each tooth of the plurality of teeth has a root, a neck extending from the root and a head opposite the root. The neck has a maximum width. Each adjacent pair of teeth of the plurality of teeth has a pitch measured at the roots of the corresponding teeth. The assembly also includes a winding wrapped around each tooth of at least three teeth of the plurality of teeth of the stator core. A ratio of the root tooth diameter of the stator core to the outer diameter of the stator core is less than about 0.75. A ratio of the maximum tooth neck width to the tooth pitch measured at the root of the teeth is greater than about 0.36.

In other embodiments, the present invention relates to an electric machine comprising a stator core having a hub and a plurality of teeth extending radially outward from the hub. Each tooth of the plurality of teeth having a root, a neck extending from the root and a head opposite the root. The neck has a maximum width. Each adjacent pair of teeth of the plurality of teeth has a pitch measured at the roots of the corresponding teeth. The machine also comprises a winding wrapped around each tooth of at least three teeth of the plurality of teeth of the stator core. In addition, the machine comprises a rotor body rotatably mounted on the stator core including an annular wall having an interior surface facing the stator core. The machine also includes a plurality of magnets positioned on the annular wall of the rotor body for creating a plurality of magnetic dipoles spaced circumferentially around the annular wall creating magnetic flux inside the interior surface of the rotor body wall. Each of the plurality of magnets has a maximum residual inductance (Br) of no more than about 12,000 Gauss. A ratio of the maximum tooth neck width to the tooth pitch measured at the root of the teeth is greater than about 0.36.

In still other embodiments, the present invention relates to an electric machine comprising a stator core having a hub and a plurality of teeth extending radially outward from the hub. The stator core has a root tooth diameter and an outer diameter. The machine includes a winding wrapped around each tooth of at least three teeth of the plurality of teeth of the stator core. Further, the machine comprises a rotor body rotatably mounted on the stator core including an annular wall having an interior surface facing the stator core. A ratio of the root tooth diameter of the stator core to the outer diameter of the stator core is less than about 0.75.

In yet other embodiments, the present invention relates to a stator assembly adapted for use in an external rotor electric motor. The assembly comprises a stator core having a hub and a plurality of teeth extending radially outward from the hub. The stator core has a root tooth diameter and an outer diameter. The assembly includes a winding wrapped around each tooth of at least three teeth of the plurality of teeth of the stator core. A ratio of the root tooth diameter of the stator core to the outer diameter of the stator core is less than about 0.75.

In other embodiments, the present invention relates to a stator assembly adapted for use in an external rotor electric motor having a rotor body rotatably mounted on the stator assembly, the rotor body comprising a plurality of magnets having a maximum residual inductance (Br) or no more than about 12,000 Gauss for creating a plurality of magnetic dipoles spaced circumferentially around the rotor body, the assembly comprising: a stator core having a hub, a plurality of teeth extending radially outward from the hub, each tooth of the plurality of teeth having a root, a neck extending from the root and a head opposite the root, the neck having a maximum width, each adjacent pair of teeth of the plurality of teeth has a pitch measured at the roots of the corresponding teeth; and a winding wrapped around each tooth of at least three teeth of the plurality of teeth of the stator core; and wherein a ratio of the maximum tooth neck width to the tooth pitch measured at the root of the teeth is greater than about 0.36.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION

Figure 1:
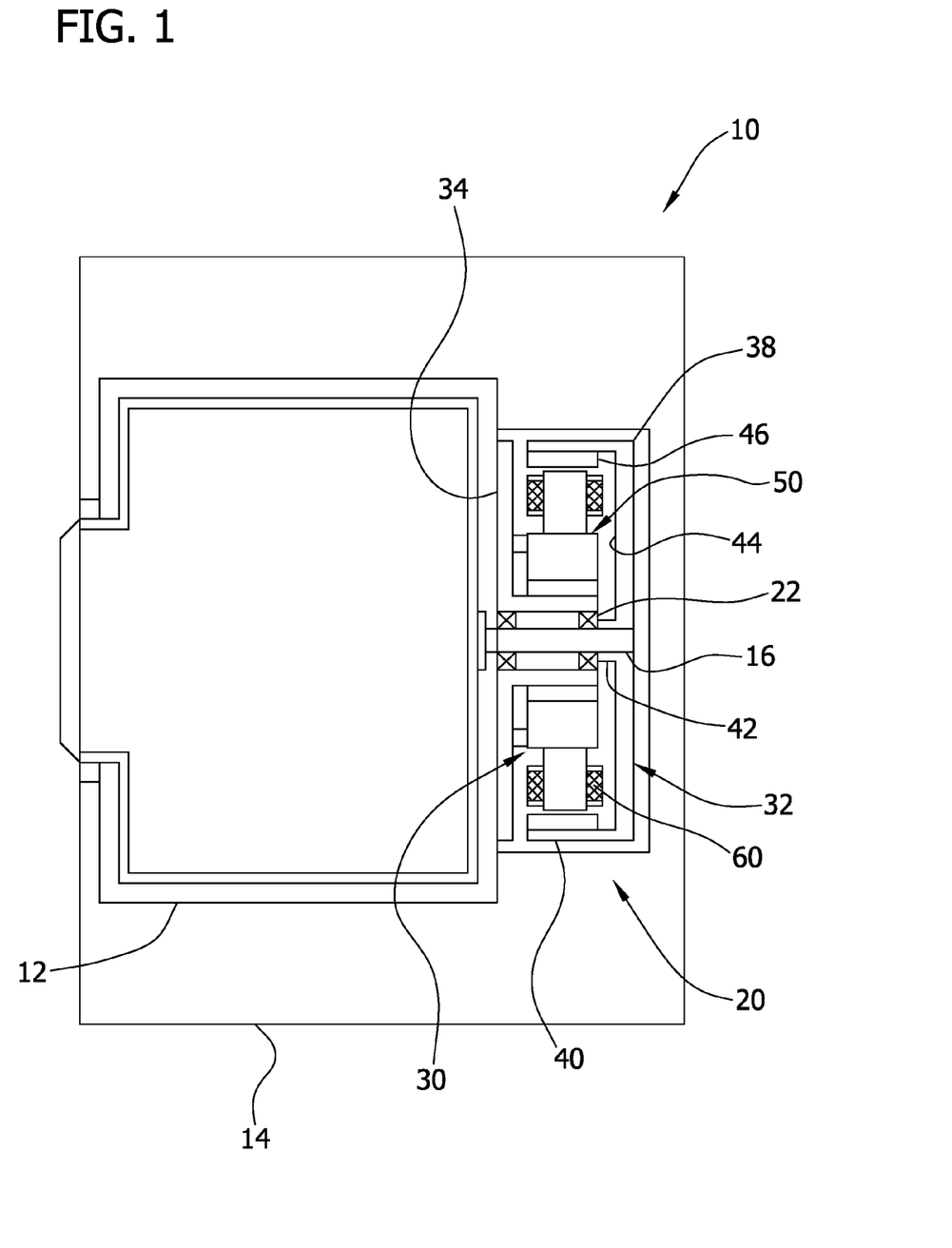
FIG. 1 is a schematic cross-sectional side elevation of a front load washing machine driven by an external rotor, brushless permanent magnet (BPM) electric machine according to one embodiment of the present invention.

Referring now to the drawings and in particular FIG. 1, an electric apparatus is designated in its entirety by the reference number 10. In one embodiment, the apparatus 10 consists of a front loading washing machine having a washer drum 12 rotatably supported within a housing 14. A shaft 16 couples the drum 12 to an electric motor, generally designated by 20, positioned behind the drum. Bearings 22 rotatably support the shaft 16.

In one embodiment, the electric motor 20 is an external rotor, brushless permanent magnet (BPM) electric motor mounted in the housing 14 of the washing machine 10. The electric motor 20 includes an internal stator assembly, generally designated by 30, and an external rotor assembly, generally designated by 32. The internal stator assembly 30 is fastened to a mounting bracket 34 positioned in the housing 14 behind the drum 12. The external rotor assembly 32 is coupled to the drum 12 by the shaft 16. The external rotor assembly 32 includes a body 38 having an outer rim 40 and a central hub 42 partially bounding a central cavity 44 in which the internal stator assembly 30 is positioned. Permanent magnets 46 are mounted on an internal surface of the outer rim 40 of the external rotor assembly 32. Each magnet 46 has two or more magnetic poles. Although the external rotor assembly 32 may have other numbers of poles without departing from the scope of the present invention, in one embodiment the rotor assembly has 42 poles. Although the permanent magnets 46 may be made of other materials without departing from the scope of the present invention, in one embodiment the permanent magnets are made of strontium ferrite. In one embodiment, the magnets have a maximum residual induction (or residual flux density) (Br) of less than or equal to about 12,000 Gauss. As will be appreciated by those skilled in the art, the magnets 46 provide magnetic dipoles spaced circumferentially around the outer rim 40 creating magnetic flux inside the interior surface of the rotor rim. In other embodiments, the maximum residual induction (Br) is less than about 8000 Gauss. In some embodiments, the maximum residual induction (Br) is less than about 5000 Gauss.

Figure 2:
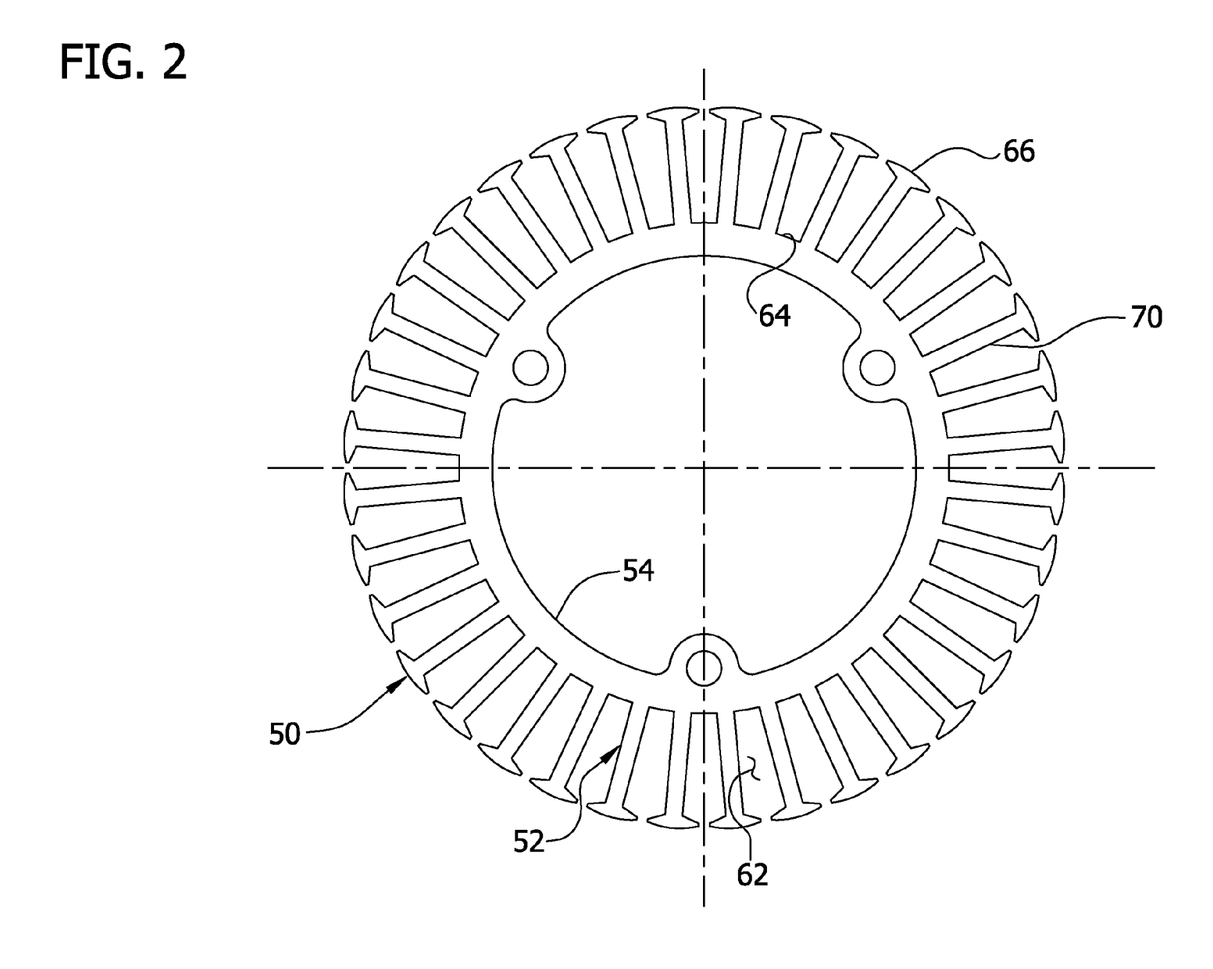
FIG. 2 is an end elevation of a stator core of the external rotor, BPM electric machine according to the present invention.

As illustrated in FIG. 2, the internal stator assembly 30 includes a laminated core, generally designated by 50, having equally spaced teeth, generally designated by 52, extending radially outward from a central mounting flange or hub 54. Although the stator core 50 may have different numbers of teeth 52 without departing from the scope of the present invention, in one embodiment the core has from about 12 teeth to about 48 teeth. In one particular embodiment, the core 50 has about 36 teeth.

As shown in FIG. 1, windings 60 are wound around the stator teeth 52. In one embodiment, the windings 60 are each made from a single strand of aluminum wire wound around the tooth a plurality of times. Although wires having other characteristics may be used without departing from the scope of the present invention, in one embodiment the wires are 20 American Wire Gauge, insulated, single strand, copper clad, aluminum wire. In other embodiments, the wire may be substantially all copper or all aluminum. Although the wires may have other cross-sectional shapes without departing from the scope of the present invention, in one embodiment the wire has a round cross section. Depending upon the solidity factor required to obtain suitable slot density, other cross-sectional shapes may be used. The stator assembly 30 may be wound in one several different ways, including series wound, parallel wound and multiple path parallel wound, as would be understood by those skilled in the art. Electric current flows through the windings 60 generating a rotating magnetic field that interacts with the magnetic poles of the permanent magnets 46 to drive the external rotor assembly 32 to rotate relative to the stator assembly 30.

Figure 3:
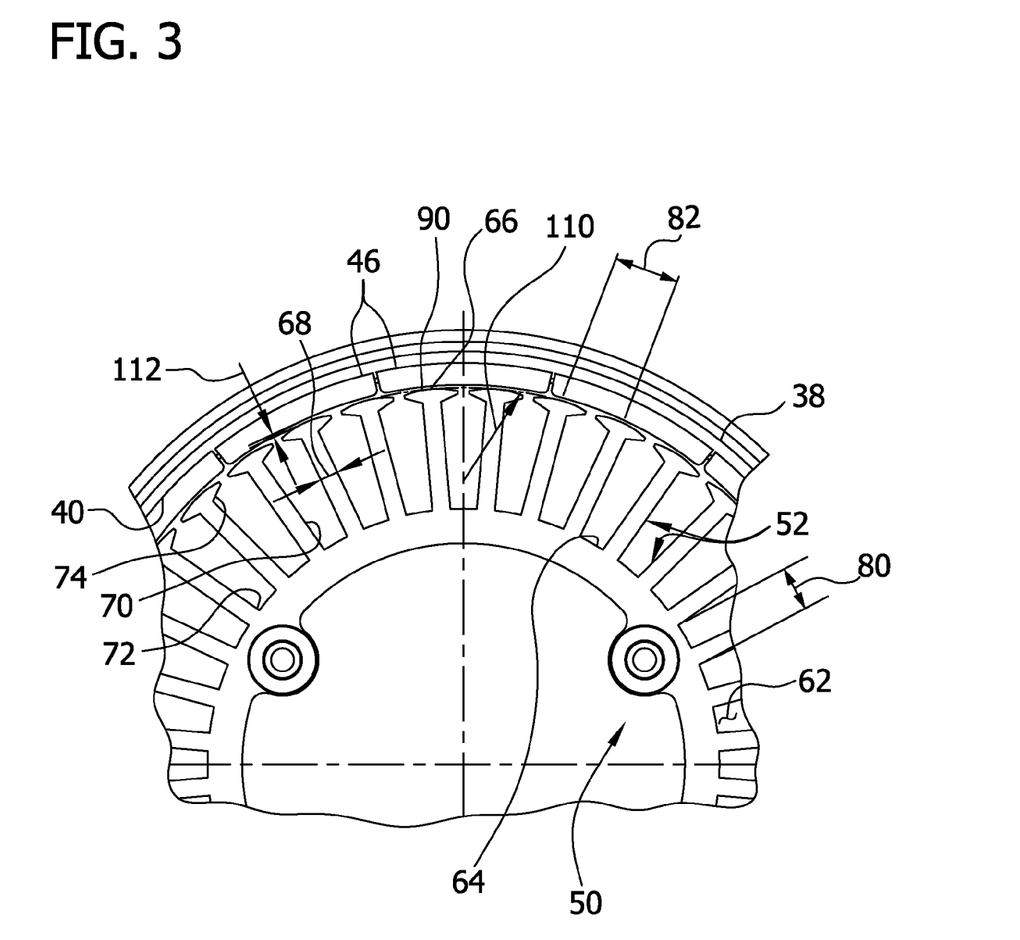
FIG. 3 is an enlarged end elevation of a portion of the external rotor, BPM electric machine.

The laminated core 50 is formed by stacking laminae or laminations. Although core 50 may be formed in other ways without departing from the scope of the present invention, the core of one embodiment is formed from 54 laminae, each having a thickness of about 0.5 millimeter (mm). The core 50 of this embodiment has a total thickness of about 27 mm. Although the laminae may be made of other materials without departing from the scope of the present invention, in one embodiment the laminae are made from a low silicon steel alloy. As will be appreciated by those skilled in the art, the laminae may be formed in sectors and stacked in a staggered configuration without departing from the scope of the present invention As shown in FIGS. 2 and 3, each tooth 52 of the laminated stator core 50 is generally T-shaped. The teeth 52 are spaced by slots 62 extending outward from a root tooth diameter 64 to a stator outer diameter 66. The stator core 50 has (12×n)

slots 62 and the teeth 52 are wound to correspond to (12±2)n magnetic poles. The value n is an integer that is greater than zero (i.e., n=1, 2, 3, 4, . . . ). Exemplary slot and pole combinations defined by the stator core 50 include 12 slots and 10 poles, 12 slots and 14 poles, 24 slots and 20 poles, 24 slots and 28 poles, 36 slots and 30 poles, 36 slots and 42 poles, etc.

As further shown in FIG. 3, the core 50 includes the root tooth diameter 64 and the stator outer diameter 66. Although the core 50 may have other root tooth diameters 64 and outer diameters 66 without departing from the scope of the present invention, in one embodiment the stator has a root tooth diameter from about 100 mm to about 200 mm and an outer diameter from about 220 mm to about 300 mm. In one particular embodiment, the tooth 52 has a root tooth diameter 64 of about 180 mm and an outer diameter 66 of about 264 mm. Further, each tooth 52 has a generally constant width 68 along a neck 70 of the tooth extending between a root 72 at an outside diameter of the hub 54 and a head 74 at a tip of the tooth. Although the teeth 52 may have necks 70 having other widths 68 without departing from the scope of the present invention, in one embodiment each of the teeth has a neck width from about 6 mm to about 10 mm. In one particular embodiment, the each tooth 52 has a neck width 68 of about 7.7 mm. Each pair of adjacent teeth 52 is separated by a slot 62 having a varying width from the root 72 of the respective teeth to the head 74 of the teeth. The slots 62 initially become wider along the neck 70 from the root 72 to the head 74 and then become narrower near the head as a result of the T-shaped heads of the teeth 52. As will be understood by those skilled in the art, tooth width 68 along the neck 70 may vary, rather than remain constant, over the length of the tooth neck. The neck 70 has a maximum tooth neck width 68. In the case of a tooth 52 having a generally constant width 68 along its neck, the maximum tooth neck width 68 is the same as the tooth neck width. In contrast, in the case of a tooth 52 having a width varying along its length, the maximum tooth neck width is measured at the widest point of the tooth neck.

Tooth pitch is defined as the arc length between corresponding faces of adjacent teeth 52 as illustrated in FIG. 3. Tooth pitch varies at different radial positions along the teeth 52. For example, the teeth 52 have an inner tooth pitch 80 measured at the root 72 of the teeth and an outer tooth pitch 82 measured at the outer diameter 66 of the stator core 50. Although the core 50 may have other tooth pitches without departing from the scope of the present invention, in one embodiment the core has an inner tooth pitch 80 from about 12 mm to about 20 mm and an outer tooth pitch 82 from about 16 mm to about 27 mm. In one particular embodiment, the core 50 has an inner tooth pitch 80 of about 15.7 mm and an outer tooth pitch 82 of about 23.4 mm.

Figure 4:
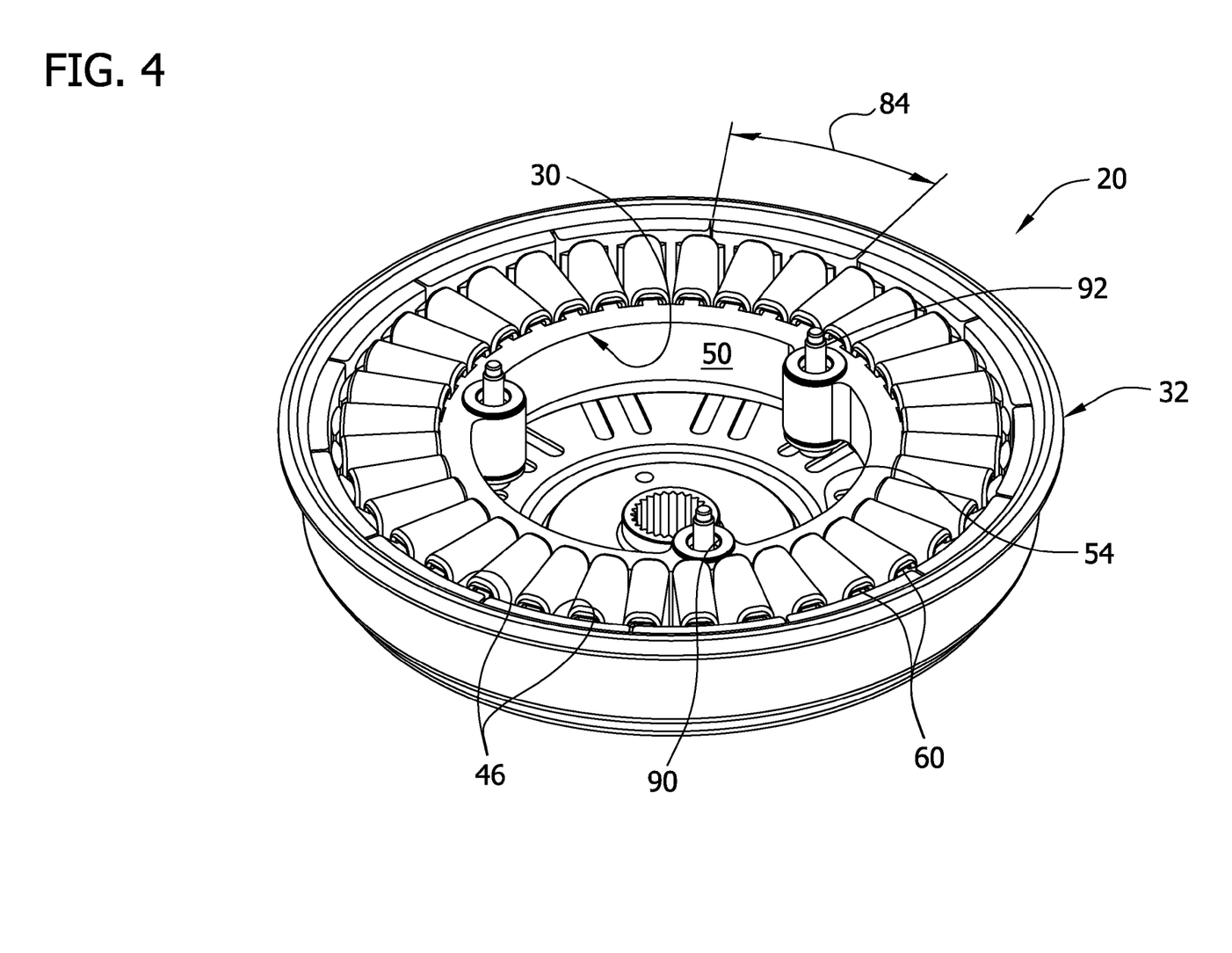
FIG. 4 is a perspective of the external rotor, BPM electric machine
Figure 5:
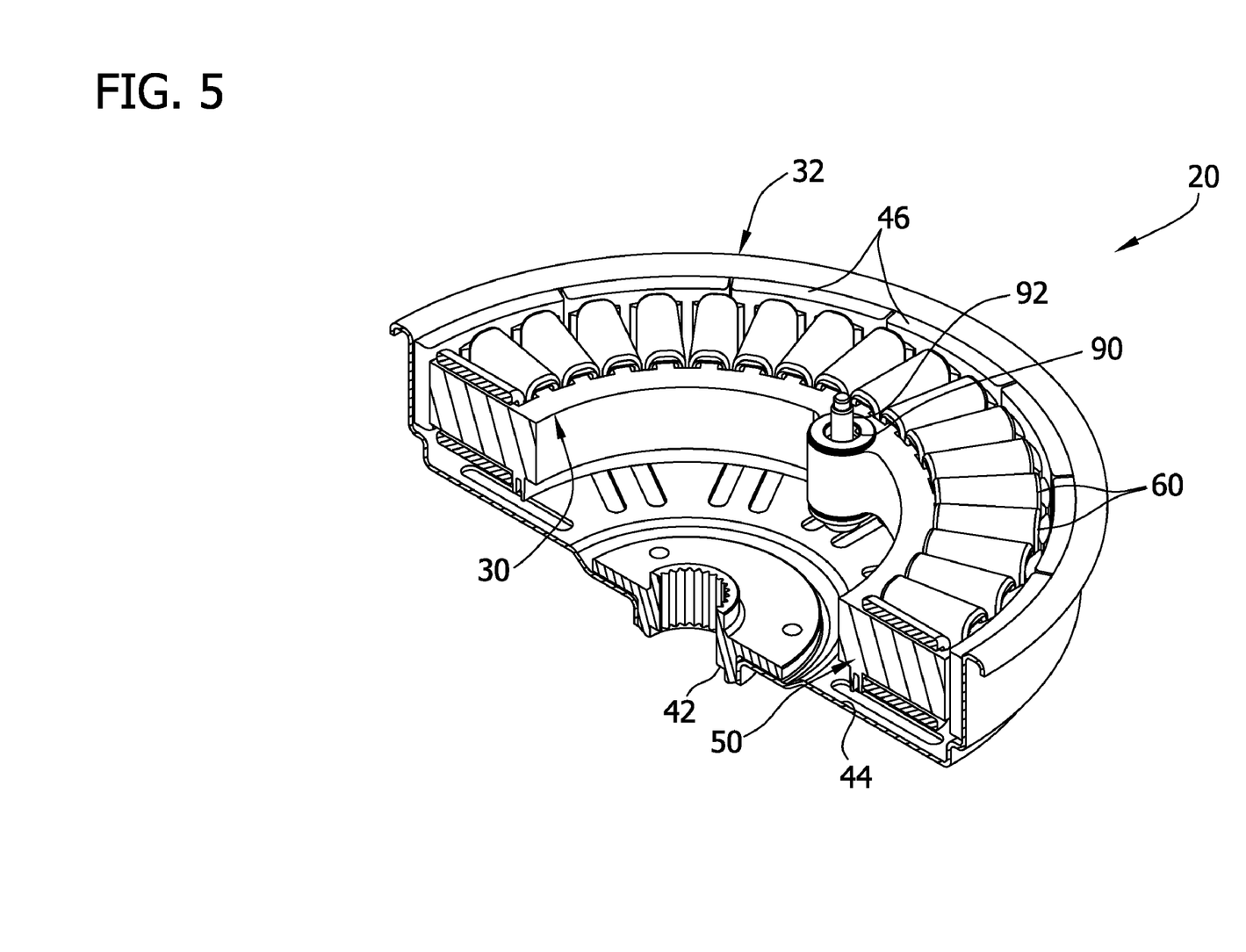
FIG. 5 is a sectioned perspective of the external rotor, BPM electric machine in section.
Figure 6:
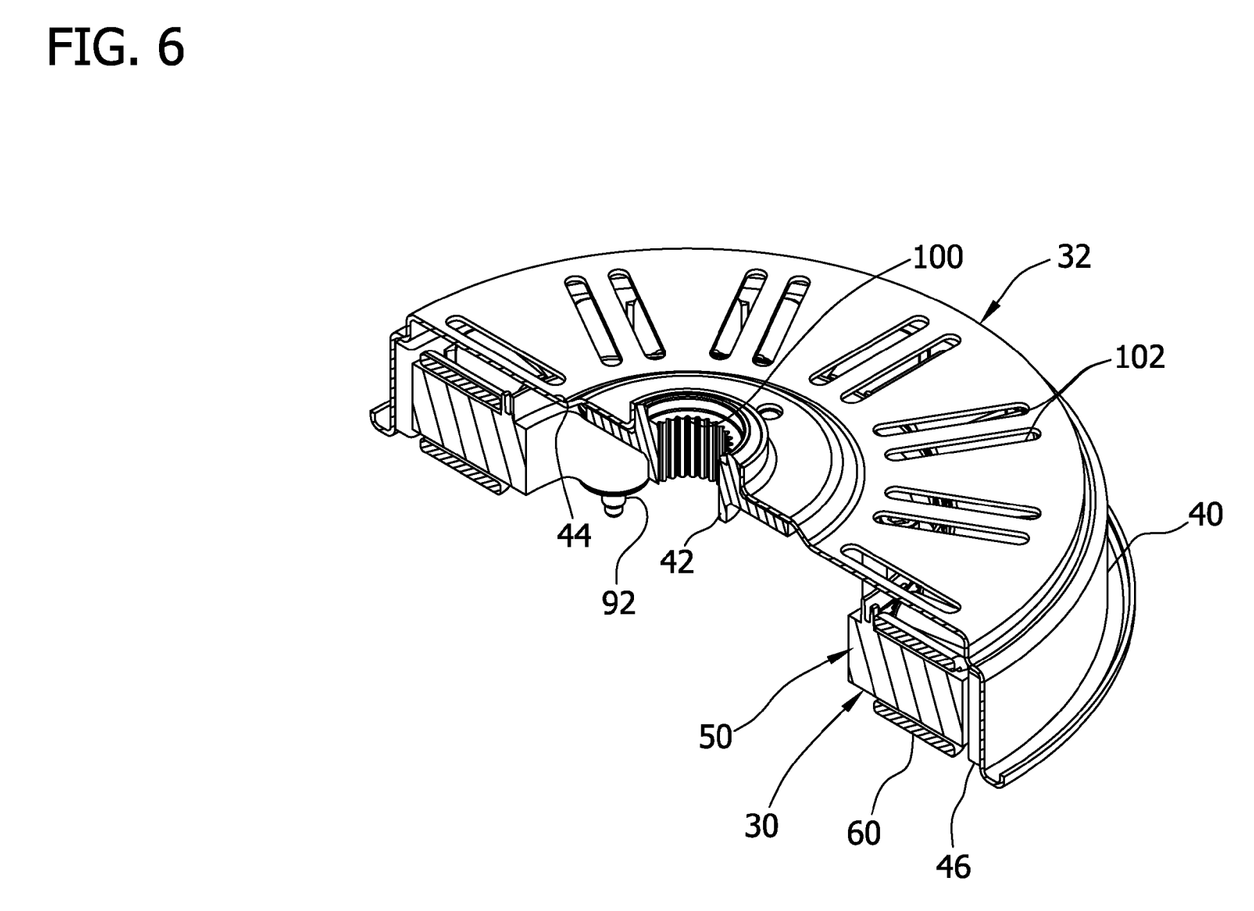
FIG. 6 is another sectioned perspective of the external rotor, BPM electric machine in partial section.

The external rotor assembly 32 has a magnetic pitch 84 which is defined as an arc length between corresponding poles of adjacent pole pairs measured at an inner diameter of the magnets 46 as illustrated in FIG. 4. Although the rotor assembly 32 may have other magnetic pitches without departing from the scope of the present invention, in one embodiment the assembly has magnetic pitch 84 from about 10 mm to about 30 mm. In one particular embodiment, the rotor assembly 32 has a magnetic pitch 84 of about 19.7 mm. As further shown in FIG. 4, holes 90 are provided in the stator core 50 for receiving bolts 92 to fasten the stator core to the bracket 34 (FIG. 1) positioned in the housing 14 behind the drum 12. As shown in FIGS. 5 and 6, a spline coupling 100 is provided in the hub 42 of the rotor assembly 32 for connecting the rotor to the shaft 16 (FIG. 1). Openings 102 are also provided in the hub 42 for reducing material used in the rotor.

The stator assembly 30 and rotor assembly 32 have other unique geometric parameters that permit the motor 20 to have aluminum windings 60 without sacrificing overall performance. For example, the stator core 50 is formed so that a ratio of root tooth diameters 64 to stator outer diameters 66 is less than about 0.75. More particularly, the root tooth diameter 64 may be about 180 mm and the stator outer diameter 66 may be about 264 mm, resulting in a ratio of 180/264 or 0.68. Although the ratio of stator root tooth to stator outer diameter may have other values without departing from the scope of the present invention, in some embodiments this ratio is about 0.74 or less. In some embodiments this ratio is less than about 0.7. In one particular embodiment, this ratio is about 0.684. These ratios provide sufficient slot area for acceptable wire losses. In particular, so that a less conductive winding material (e.g., aluminum) may be used while maintaining a performance equivalent to a conventional copper motor, these ratios expand the slot area radially inwardly, such that sufficient quantities of wire can be used, without increasing motor diameter or length, as conventional wisdom would dictate. These ratios also provide a slot profile tolerant of production winding techniques.

Particular ratios of maximum tooth neck width 68 to inner tooth pitch have also been found to be advantageous in obtaining a motor 20 having aluminum windings 60. For example, the stator core 50 may be formed so that a ratio of maximum tooth neck width 68 to inner tooth pitch 80 is greater than about 0.36. Although the ratio of maximum tooth neck width 68 to inner tooth pitch 80 may have other values without departing from the scope of the present invention, in some embodiments this ratio is at least about 0.37. In one particular embodiment, the ratio of maximum tooth neck width 68 to inner tooth pitch 80 is about 0.49. Likewise, particular ratios of maximum tooth neck width 68 to magnetic pitch 84 have been found to be advantageous in obtaining a motor 20 having aluminum windings 60. Although the ratio of maximum tooth neck width 68 to magnetic pitch 84 may have other values without departing from the scope of the present invention, in some embodiments this ratio is at least 0.31. In one particular embodiment, the ratio of maximum tooth neck width 68 to magnetic pitch 84 is about 0.39. These ratios provide sufficient tooth neck width to maintain reasonable amperage turn drops (i.e., current) in the teeth to drive the flux through the teeth, thereby reducing the undesirable effects of flux saturation. In addition, these ratios structurally strengthen (i.e., stiffen) the teeth to resist forces and reduce vibration (and therefore, noise).

As further illustrated in FIG. 3, radially outer faces 90 of the stator teeth 52 are crowned so they have a radius 110 that is less than half the outer diameter 66. Radial clearance 112 is provided between the internal stator assembly 30 and the permanent magnets 46. The crown is formed such that radial clearance at the ends of the crowned face 90 are from about 1.10 to about 2.00 times the size of the radial clearance at the center of the face. Although the stator assembly 30 and rotor assembly 32 may be formed to produce motors 20 having other radial clearances without departing from the scope of the present invention, in one embodiment the radial clearance 94 is between about 0.10 mm and about 2 mm. In one particular embodiment, the radial clearance 94 is about 1.9 mm.

As other features of the washing machine 10 and motor 20 are generally understood by those of ordinary skill in the art, the conventional aspects of these devices will not be described in further detail.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A stator assembly adapted for use in an external rotor electric motor, said assembly comprising:
   a stator core having a hub, a plurality of teeth extending radially outward from the hub, a root tooth diameter and an outer diameter, each tooth of said plurality of teeth having a root, a neck extending from the root and a head opposite the root, said neck having a maximum width, and each adjacent pair of teeth of said plurality of teeth has a pitch measured at the roots of the corresponding teeth; and
   a winding wrapped around each tooth of at least three teeth of said plurality of teeth of the stator core;
   wherein the outer diameter of the stator core is between about 220 mm and about 300 mm;
   wherein a ratio of the root tooth diameter of the stator core to the outer diameter of the stator core is less than about 0.7; and
   wherein a ratio of the maximum tooth neck width to the tooth pitch measured at the root of the teeth is greater than about 0.36.

2. A stator assembly as set forth in claim 1 wherein the root tooth diameter of the stator core is between about 100 mm and about 200 mm.

3. A stator assembly as set forth in claim 2 wherein root tooth diameter of the stator core is about 180 mm and the outer diameter of the stator core is about 264 mm.

4. A stator assembly as set forth in claim 2 wherein the ratio of the root tooth diameter of the stator core to the outer diameter of the stator core is about 0.68.

5. A stator assembly as set forth in claim 1 wherein the ratio of the maximum tooth neck width to the tooth pitch measured at the root of the teeth is greater than about 0.37.

6. A stator assembly as set forth in claim 5 wherein the ratio of the maximum tooth neck width to the tooth pitch measured at the root of the teeth is greater than about 0.45.

7. A stator assembly as set forth in claim 6 wherein the ratio of the maximum tooth neck width to the tooth pitch measured at the root of the teeth is about 0.5.

8. A stator assembly as set forth in claim 6 wherein the ratio of the maximum tooth neck width to the tooth pitch measured at the root of the teeth is about 0.49.

9. A stator assembly as set forth in claim 1 wherein the winding comprises at least one of aluminum and copper.

10. A stator assembly as set forth in claim 9 wherein the winding comprises copper clad aluminum.

11. An electric machine comprising:
    a stator core having a hub and a plurality of teeth extending radially outward from the hub, each tooth of said plurality of teeth having a root, a neck extending from the root and a head opposite the root, said neck having a maximum width, each adjacent pair of teeth of said plurality of teeth having a pitch measured at the roots of the corresponding teeth;
    a winding wrapped around each tooth of at least three teeth of said plurality of teeth of the stator core;
    a rotor body rotatably mounted on the stator core including an annular wall having an interior surface facing said stator core; and
    a plurality of magnets positioned on the annular wall of the rotor body for creating a plurality of magnetic dipoles spaced circumferentially around the annular wall creating magnetic flux inside the interior surface of the rotor body wall, each of said plurality of magnets having a maximum residual inductance (Br) of no more than about 12,000 Gauss;
    wherein the outer diameter of the stator core is between about 220 mm and about 300 mm;
    wherein a ratio of the root tooth diameter of the stator core to the outer diameter of the stator core is less than about 0.7; and
    wherein a ratio of the maximum tooth neck width to the tooth pitch measured at the root of the teeth is greater than about 0.36.

12. An electric machine as set forth in claim 11 wherein the ratio of the maximum tooth neck width to the tooth pitch measured at the root of the teeth is at least about 0.37.

13. An electric machine as set forth in claim 12 wherein the ratio of the maximum tooth neck width to the tooth pitch measured at the root of the teeth is at least about 0.45.

14. An electric machine as set forth in claim 13 wherein the ratio of the maximum tooth neck width to the tooth pitch measured at the root of the teeth is about 0.5.

15. An electric machine as set forth in claim 13 wherein the ratio of the maximum tooth neck width to the tooth pitch measured at the root of the teeth is about 0.49.

16. An electric machine as set forth in claim 11 wherein the stator core is positioned inside the plurality of magnets and the windings are selectively energized to drive the rotor body to rotate relative to the core.

17. An electric machine as set forth in claim 11 wherein the maximum residual inductance (Br) of each of said plurality of magnets is no more than about 8000 Gauss.

18. An electric machine as set forth in claim 17 wherein the maximum residual inductance (Br) of each of said plurality of magnets is no more than about 5000 Gauss.

19. An electric machine comprising:
    a stator core having a hub and a plurality of teeth extending radially outward from the hub, the stator core having a root tooth diameter and an outer diameter;
    a winding wrapped around each tooth of at least three teeth of said plurality of teeth of the stator core; and
    a rotor body rotatably mounted on the stator core including an annular wall having an interior surface facing said stator core;
    wherein the outer diameter of the stator core is between about 220 mm and about 300 mm and
    wherein a ratio of the root tooth diameter of the stator core to the outer diameter of the stator core is less than about 0.7.

20. An electric machine as set forth in claim 19 wherein the root tooth diameter of the stator core is between about 100 mm and about 200 mm.

21. An electric machine as set forth in claim 20 wherein root tooth diameter of the stator core is about 180 mm and the outer diameter of the stator core is about 264 mm.

22. An electric machine as set forth in claim 19 wherein the ratio of the root tooth diameter of the stator core to the outer diameter of the stator core is about 0.68.

23. An electric machine as set forth in claim 19 further comprising a plurality of magnets positioned on the annular wall of the rotor body, wherein the stator core is positioned inside the plurality of magnets and the windings are selectively energized to drive the rotor body to rotate relative to the core.

24. An electric machine as set forth in claim 19 wherein the thickness of the winding wrapped around each tooth is substantially uniform.

25. An electric machine as set forth in claim 19 wherein the winding comprises at least one of aluminum and copper.

26. An electric machine as set forth in claim 25 wherein the winding comprises copper clad aluminum.

27. An electric machine as set forth in claim 19 further comprising a plurality of magnets positioned on the annular wall of the rotor body for creating a plurality of magnetic dipoles spaced circumferentially around the annular wall creating magnetic flux inside the interior surface of the rotor body wall, each of said plurality of magnets having a maximum residual inductance (Br) of no more than about 12,000 Gauss.

28. An electric machine as set forth in claim 27 wherein the maximum residual inductance (Br) of each of said plurality of magnets is no more than about 8000 Gauss.

29. An electric machine as set forth in claim 28 wherein the maximum residual inductance (Br) of each of said plurality of magnets is no more than about 5000 Gauss.

30. A stator assembly adapted for use in an external rotor electric motor, said assembly comprising:
    a stator core having a hub and a plurality of teeth extending radially outward from the hub, the stator core having a root tooth diameter and an outer diameter; and
    a winding wrapped around each tooth of at least three teeth of said plurality of teeth of the stator core;
    wherein the outer diameter of the stator core is between about 220 mm and about 300 mm; and
    wherein a ratio of the root tooth diameter of the stator core to the outer diameter of the stator core is less than about 0.7.

31. A stator assembly as set forth in claim 30 wherein the root tooth diameter of the stator core is between about 100 mm and about 200 mm.

32. A stator assembly as set forth in claim 31 wherein the root tooth diameter of the stator core is about 180 mm and the outer diameter of the stator core is about 264 mm.

33. A stator assembly as set forth in claim 30 wherein the ratio of the root tooth diameter of the stator core to the outer diameter of the stator core is about 0.68.

34. A stator assembly as set forth in claim 30 wherein the winding comprises at least one of aluminum and copper.

35. A stator assembly as set forth in claim 34 wherein the winding comprises copper clad aluminum.

36. A stator assembly adapted for use in an external rotor electric motor having a rotor body rotatably mounted on the stator assembly, said rotor body comprising a plurality of magnets having a maximum residual inductance (Br) or no more than about 12,000 Gauss for creating a plurality of magnetic dipoles spaced circumferentially around the rotor body, said assembly comprising:
    a stator core having a hub, a plurality of teeth extending radially outward from the hub, each tooth of said plurality of teeth having a root, a neck extending from the root and a head opposite the root, said neck having a maximum width, each adjacent pair of teeth of said plurality of teeth has a pitch measured at the roots of the corresponding teeth; and
    a winding wrapped around each tooth of at least three teeth of said plurality of teeth of the stator core;
    wherein the outer diameter of the stator core is between about 220 mm and about 300 mm;
    wherein a ratio of the root tooth diameter of the stator core to the outer diameter of the stator core is less than about 0.7; and
    wherein a ratio of the maximum tooth neck width to the tooth pitch measured at the root of the teeth is greater than about 0.36.

37. A stator assembly as set forth in claim 36 wherein the ratio of the maximum tooth neck width to the tooth pitch measured at the root of the teeth is at least about 0.37.

38. A stator assembly as set forth in claim 37 wherein the ratio of the maximum tooth neck width to the tooth pitch measured at the root of the teeth is at least about 0.45.

39. A stator assembly as set forth in claim 38 wherein the ratio of the maximum tooth neck width to the tooth pitch measured at the root of the teeth is at least about 0.5.

40. A stator assembly as set forth in claim 39 wherein the ratio of the maximum tooth neck width to the tooth pitch measured at the root of the teeth is about 0.49.

41. A stator assembly as set forth in claim 36 wherein the winding comprises at least one of aluminum and copper.

42. A stator assembly as set forth in claim 41 wherein the winding comprises copper clad aluminum.

* * * * *